Figure 1:
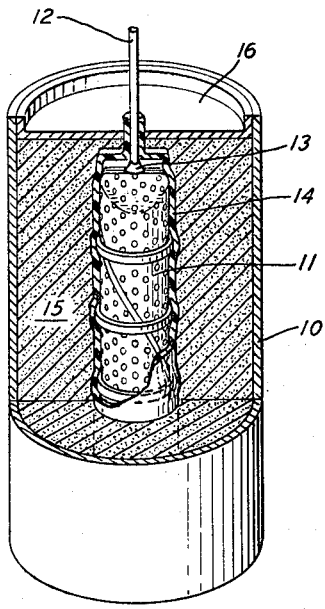

May 21, 1968  E. J. McHENRY  3,384,513

SEALED NICKEL-CADMIUM CELL

Filed June 28, 1966

INVENTOR
E. J. McHENRY
BY
ATTORNEY

United States Patent Office 3,384,513
Patented May 21, 1968

3,384,513
SEALED NICKEL-CADMIUM CELL
Edwin J. McHenry, Millington, N.J., assignor to Bell Telephone Laboratories, Incorporated, Murray Hill, N.J., a corporation of New York
Filed June 28, 1966, Ser. No. 561,246
1 Claim. (Cl. 136—13)

This invention relates to sealed nickel-cadmium cells in which a novel plate construction and configuration results in a cell of unusual simplicity and ease of manufacture.

Early storage batteries were vented to allow the gases produced on overcharge to escape. Evolution of gas from the storage battery is undesirable for two reasons: first, water is lost through electrochemical decomposition and electrolyte is carried off in the evolved gas; second, the lost electrolyte is very corrosive to the surroundings.

The problem of gas evolution on overcharge was solved with the sealed nickel-cadmium battery developed just prior to and during World War II. The cell is designed so that the positive electrode becomes fully charged before the negative which has excess active material. Oxygen, evolved at the positive, migrates to the negative electrode where it is reduced back to hydroxide.

The functional advantages of the sintered plate battery are accompanied by an increase in cost. Fabrication and impregnation of the sintered nickel electrode is complicated, time consuming and expensive. This disadvantage prompted the search for a simpler, less expensive means of construction which could be operated successfully in the sealed condition. Current commercial sealed nickel-cadmium batteries are ordinarily made with sintered plates impregnated with active material which have been quite successful in giving a relatively high energy density and reliable performance over a long cell life.

The cell construction of this invention is considerably simpler and less expensive and produces a product which is the approximate equivalent of the sintered plate nickel-cadmium cell for many purposes.

According to the invention the positive plate is made in the tubular form usually found in Edison cells. A description of a typical method for forming a single tube of positive material is described in detail in "Storage Batteries," 4th edition, by G. W. Vinal, John Wiley & Sons, Inc., pages 85–87.

In one embodiment of the invention a single tubular nickel electrode is covered with a standard separator material and concentrically placed in a larger metal tube. A mixture of cadmium oxide and a conductive metal powder such as nickel powder is packed into the annulus between the tubes. Electrolyte such as KOH is added, air is evacuated and the cell is sealed. This construction provides a simple and effective sealed nickel-cadmium cell. Cells having various alternative geometries can be made using the same general principles of construction. For instance, in one particular alternative embodiment, several tubular nickel electrodes attached to each other are placed in a rectangular receptacle with the mixture of active negative material packed around the several positive electrodes.

These and other aspects of the invention will be described in greater detail in the following specific description.

Figure 2:
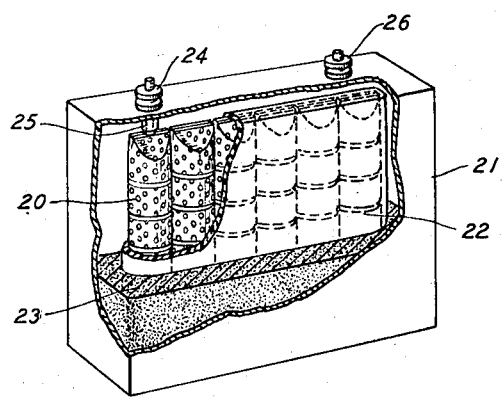

In the drawing:

FIG. 1 is a perspective view partly cut away of a cell constructed according to the invention; and FIG. 2 is a perspective view partly cut away of a cell similar in essential construction details to that of FIG. 1 except that a different geometry is used.

In FIG. 1 the tube 10 forms the cell container and also conveniently serves as the external negative contact. Within the tube 10 is disposed a conventional tubular positive electrode 11. The tubular electrode is essentially a metal tube, usually a perforated nickel-plated steel tube, containing nickelous hydroxide powder and nickel flakes, the latter to improve conductivity.

In a typical commercial manufacturing method the positive electrode tubes are prepared from cold-rolled carbon-steel ribbon which is perforated by passing through special rolls that punch 560 holes to the square inch. The burrs are removed by emery wheels and the ribbon is cleaned by revolving wire brushes to insure that the perforations are open so that the electolyte may have free access to the active material within the tube. The steel ribbon is then nickel-plated by passing it continuously through a series of tanks containing the necessary solutions for cleaning, plating and washing. The first of these tanks contains a solution of sodium carbonate to remove the grease from the steel ribbon. This is followed by a tank of hot water to wash off the alkali. The next tank contains a solution of nickel sulfate, in which the nickel-plating is done. This is followed by two washing tanks containing hot and cold water and finally the steel ribbon is passed through a tank containing a dilute solution of ammonium hydroxide. The time required for a given point on the ribbon to pass through the series of plating baths is about eight minutes. After the nickel-plating process is finished, the ribbon is dried and annealed in an atmosphere of hydrogen. The purpose of this annealing is to fuse together the nickel-plate and the underlying steel in order to prevent possible scaling off of the nickel-plating. The annealing is done in an atmosphere of hydrogen to prevent oxidation or discoloration that might otherwise take place.

The tubes which contain the active material of the positive plates are made from the nickel-plated steel ribbon, by winding it spirally. The seams are lapped and swaged flat. The tubes are customarily made one-quarter inch in diameter and four and one-half inches long.

The nickelous hydroxide used to fill the tube is a powder ranging between 30 and 190 mesh. The nickel is used in flake form consisting of small squares one-sixteenth inch on each side and 0.00004 inch in thickness.

In filling the tubes a cap is placed at the bottom of each tube and nickelous hydroxide and nickel flakes are alternately tamped into the tube. In the typical commercial process there are 630 alternate layers of nickelous hydroxide and nickel flakes, the nickel constituting from 5 to 30 percent of the contents of the tube, usually about 14 percent. After the tubes are filled the ends are pinched shut to form terminals.

In a standard cell employing these tubular electrodes several tubes are clamped onto a flat grid and the ultimate cell consists of flat, rectangular grids.

Referring back to FIG. 1, the tubular positive electrode 11 just described is concentrically placed within the outer tube 10. A nickel wire 12 is welded to the electrode at 13. A separator 14 is placed around the tubular electrode 11. This separator may consist of any known separator material such as pellon nonwoven nylon type 2505. The wire 12 is insulated also either with the separator material as indicated in the figure or with any appropriate insulating coating or sleeve. The annular space between the separator and the outer tube is filled with a mixture 15 of finely divided cadmium oxide and a conductive metal powder to form the negative electrode. The conductive metal powder may be silver, copper, graphite or nickel. Nickel is preferred as being most compatible with the system and relatively inexpensive as compared with silver. These materials may be in the form of powders having 325 mesh to 100 mesh or in alternative finely divided form such as the nickel flake described above. The weight ratio of cadmium oxide-to-nickel is advantageously maintained within the range of 0.1 to 2.0.

The electrolyte for the cell is a standard potassium hydroxide solution generally having a specific gravity in the range 1.19 to 1.30. The cell is filled with sufficient electrolyte to fill 30 percent to 70 percent of the voids. The cell is sealed to the atmosphere by welding the lid 16 to the tube 10.

As a specific example a cell was constructed according to the invention with cadmium oxide and nickel carbonyl powders in a 1:1 weight ratio as the negative electrode material. The tubular positive electrode was one-quarter inch in diameter and the outer tube was 7/16 inch in diameter. The cell was tested at an over-charge ratio of C/6 and showed good capacity stability over 250 charge-discharge cycles. It was found that the cell could be charged at the C rate with a moderate but temporary decrease in cell capacity. Excessive pressures did not develop at such charge rates. This type of cell was found to be especially well suited to low rate service where pocket-plate type batteries are now used.

FIG. 2 is a perspective view of a cell partly cut away which shows an alternative arrangement in which several tubular positive electrodes 20 are arranged in a rectangular metal cell receptacle 21. The positive electrodes are welded to one another in a row placing them in good electrical contact and then covered with separator material 22. The space between the electrodes 20 and the outer receptacle 21 is filled with active negative material 23 consisting of particulate cadmium oxide and nickel. The positive contact post 24 is connected to one of the tubular electrodes through an insulated bushing 25. The negative contact post 26 is made to the cell receptacle.

The outer cell receptacle in each of the embodiments described herein conveniently serves as the negative electrode. Accordingly, it preferably consists of a conductive metal such as copper or nickel. Alternatively, the outer receptacle can be steel or even plastic with an inner conductive liner around the periphery of the active negative material. A steel tube can advantageously be plated with nickel on the interior portion and the negative electrode contact made with the nickel-plating.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A sealed nickel-cadmium cell comprising a conductive metal outer tube and a tubular positive electrode, said electrode comprising a perforated metal tube containing a mixture of finely divided nickel and nickel hydroxide, said tubular positive electrode being concentrically disposed within said outer tube, a mixture of finely divided cadmium oxide and nickel having a weight ratio of CdO to Ni in the range of 0.1 to 2.0 completely filling the annulus between the tubular positive electrode and the outer tube, means for sealing the cell against the atmosphere and means for making electrical contact external of the cell to the tubular positive electrode and the outer tube.

References Cited
UNITED STATES PATENTS

| | | | |
|---|---|---|---|
| 2,994,729 | 8/1961 | Solomon et al. | 136—24 |
| 3,230,113 | 1/1966 | Herold | 136—24 |

ALLEN B. CURTIS, *Primary Examiner.*

C. F. LE FEVOUR, *Assistant Examiner.*